(12) United States Patent
Leek

(10) Patent No.: US 6,367,224 B1
(45) Date of Patent: Apr. 9, 2002

(54) HIDDEN CONNECTOR

(75) Inventor: William F. Leek, Carmel, CA (US)

(73) Assignee: Simpson Strong-Tie Co., Inc., Dublin, CA (US)

( * ) Notice: Subject to any disclaimer, the term of this patent is extended or adjusted under 35 U.S.C. 154(b) by 0 days.

(21) Appl. No.: 09/498,706

(22) Filed: Feb. 7, 2000

(51) Int. Cl.[7] ................................................ E04B 1/38
(52) U.S. Cl. ............................ 52/704; 52/708; 52/263; 52/295; 52/296; 52/298; 52/656.9; 403/408.1; 403/187; 403/200; 403/201; 403/192; 411/179; 411/187
(58) Field of Search ......................... 52/704, 708, 263, 52/295, 296, 298, 656.9, 233; 403/408.1, 187, 188, 189, 200, 201, 204, 192, 193, 194, 199; 44/176, 187, 184, 185, 179

(56) References Cited

U.S. PATENT DOCUMENTS

| 125,189 A | 4/1872 | Freeman et al. |
| 271,776 A | 2/1883 | Blanchard |

(List continued on next page.)

FOREIGN PATENT DOCUMENTS

| DE | 296 10 381 U 1 | 10/1996 |
| DE | 299 03 749 U 1 | 7/1999 |
| DE | 299 18 339 U 1 | 2/2000 |
| EP | 0 319 610 A | 6/1989 |
| GB | 1580841 A | 12/1980 |

OTHER PUBLICATIONS

Simpson Strong–Tie Co., Inc., "Wood Construction Connectors Catalog C–2000," pp. 32–39, (May 24, 1999).
KC Metal Products, Inc., "Structural Hardware Specials," Superspeed Connectors, KC Metal Products, Inc. (U.S.A.), p. 18, (1993/1994).
Simpson Strong–Tie Co., Inc., "CJT Kit: Concealed Joist The Kit," Form F–CJT–2, Simpson Strong–Tie Co., Inc. (U.S.A.), p. 1, (1998).
Simpson Strong–Tie Co., Inc., "GLB/HGLB/GLBT Beam Seats," Catalog C–2000, Simpson Strong–Tie Co., Inc. (U.S.A.), p. 12, (1999).
NHT Holzleimbauprodukte, "Neben–Haupt–Träger-–Verbinder," NHT Verbinder, NHT Holzleimbauprodukte (Germany), pp. 1–4, (received Apr. 29, 1999).jf124c

*Primary Examiner*—Carl D. Friedman
*Assistant Examiner*—Dennis L. Dorsey
(74) *Attorney, Agent, or Firm*—James R. Cypher; Charles R. Cypher

(57) ABSTRACT

A connection is created between a first member and a second member. The connector used to join the first and second members includes the following members: an attachment member, a plurality of fasteners that are received by the attachment member, and an anchor member that is also received by the attachment member. These members can be arranged in the following manner with respect to the first and second members. The fasteners are received by the attachment member and anchored in the second member. The fasteners are driven into the second member through the attachment member, thus the heads of the fasteners are closer to the attachment member than the leading tips of the fasteners. At least one of the fasteners lies at an angle to a longitudinal axis of the second member. The same fastener is also preferably driven at an angle to the central axis of the attachment member, such that the leading tip of the fastener is disposed farther away from the central axis of the attachment member than the driving head of the fastener. The anchor member is connected to the attachment member and anchored to the first member. The anchor member is formed with an elongated shank portion that is received within the first member.

28 Claims, 5 Drawing Sheets

U.S. PATENT DOCUMENTS

| | | | |
|---|---|---|---|
| 725,770 A | 4/1903 | Probasco | |
| 770,398 A | 9/1904 | Starr | |
| 1,089,878 A | 3/1914 | Steinhauser | |
| 1,335,617 A | 3/1920 | Solomon | |
| 1,503,148 A | 7/1924 | Bernstrom | |
| RE17,441 E | 9/1929 | Tasman | |
| 1,791,337 A | 2/1931 | Wendell | |
| 1,803,168 A | 4/1931 | Burgen | |
| 2,135,389 A | 11/1938 | Dempsey | |
| 2,226,168 A * | 12/1940 | Kass | 411/457 |
| 2,288,439 A * | 6/1942 | Dahm | 411/457 |
| 2,625,815 A | 1/1953 | Black | |
| 3,267,888 A * | 8/1966 | Carlson | 411/457 |
| 3,423,899 A | 1/1969 | Demers | |
| 3,845,604 A * | 11/1974 | Ottosson | 52/758 |
| 3,915,579 A * | 10/1975 | Offenbroich | 403/264 |
| 3,996,718 A | 12/1976 | Welch | |
| 4,008,971 A | 2/1977 | Wah et al. | |
| 4,240,766 A * | 12/1980 | Smith et al. | 404/10 |
| 4,295,638 A | 10/1981 | Eldeen | |
| 4,344,604 A | 8/1982 | Basey | |
| 4,367,864 A | 1/1983 | Eldeen | |
| 4,587,788 A * | 5/1986 | Bielicki | 52/698 |
| 4,614,070 A | 9/1986 | Idland | |
| 4,711,593 A | 12/1987 | Wilhelmi | |
| 4,795,294 A * | 1/1989 | Takada et al. | 411/457 |
| 4,802,786 A | 2/1989 | Yauger et al. | |
| 4,854,549 A | 8/1989 | Roberts et al. | |
| 4,869,467 A | 9/1989 | Kellison | |
| 4,965,980 A | 10/1990 | Leavens | |
| 4,981,388 A | 1/1991 | Becken et al. | |
| 5,022,209 A | 6/1991 | Kimura | |
| 5,061,111 A | 10/1991 | Hosokawa | |
| 5,062,733 A | 11/1991 | Cholid et al. | |
| 5,081,811 A * | 1/1992 | Sasaki | 52/233 |
| 5,242,239 A | 9/1993 | Hosokawa | |
| 5,253,945 A | 10/1993 | Hosokawa | |
| 5,295,754 A | 3/1994 | Kato | |
| 5,375,384 A | 12/1994 | Wolfson | |
| 5,419,538 A | 5/1995 | Nicholson et al. | |
| 5,438,811 A | 8/1995 | Goya | |
| 5,501,048 A | 3/1996 | Nakanishi | |
| 5,577,856 A | 11/1996 | Tezuka | |
| 5,598,680 A | 2/1997 | Wilhelmi | |
| 5,617,694 A | 4/1997 | Baba | |
| 5,666,774 A | 9/1997 | Commins | |
| 5,666,781 A | 9/1997 | Egawa et al. | |
| 5,709,059 A * | 1/1998 | Murphy et al. | 52/410 |
| 5,741,083 A | 4/1998 | Schvartz | |
| 5,896,721 A | 4/1999 | Sugiyama | |
| 5,937,609 A | 8/1999 | Roth | |
| 5,938,366 A | 8/1999 | Novacek | |
| 6,015,138 A | 1/2000 | Kohlberger et al. | |
| 6,032,431 A | 3/2000 | Sugiyama | |
| 6,141,928 A * | 11/2000 | Platt | 52/296 |
| 6,186,695 B1 * | 2/2001 | Kuster | 403/297 |

OTHER PUBLICATIONS

Simpson Strong–Tie Co., Inc., "Type of Connector Sometimes Used," Inventor's Drawing of Prior Art, Simpson Strong–Tie Co., Inc. (U.S.A.), p. 1, (1998).

Bulldog–Simpson GmbH, "Übersicht und Vergleich," Janebo Jane–Tu Bozett Pamphlet, Bulldog–Simpson GmbH (Germany), p. 1, (publication date unknown).

United States Patent Application Serial No. 09/519,011, filed Mar. 3, 2000.

* cited by examiner

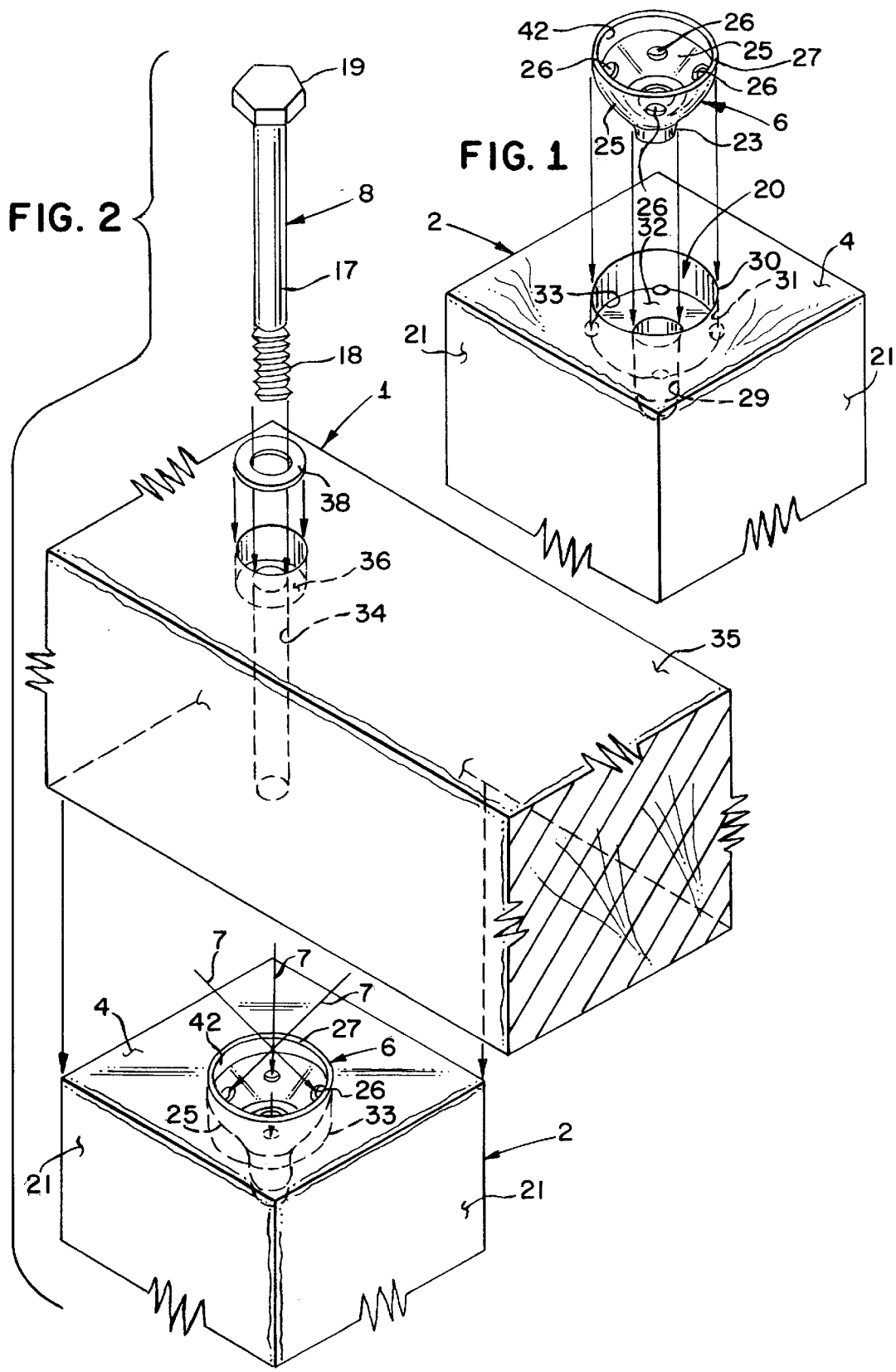

HIDDEN CONNECTOR

BACKGROUND

This invention relates to a connection between two members wherein the means of connection are almost entirely hidden. The connection is preferably used to attach a post to adjacent upper and lower horizontal members in a building structure.

Because the means of making the connection are almost entirely hidden from view, the connection of the present invention is particularly suited for building designs where the structural components of the frame of the building are exposed. In such instances, it is often desirable to hide the hardware that connects the structural members.

There are many different designs and types of hidden connectors, with some more visible than others. Generally, if a connector is relatively easy to hide, it is not particularly strong, and conversely, if the method by which the connector is hidden is complicated, the connection made is quite strong.

Most hidden connections involve removing material from one or both of the structural members to be connected. For example, a very common hidden connector is based on a T-shaped member made up of two plates, with the top of the "T" being connected to the face of one of the members, and the base of the "T" being inserted into a slot in the other member. See, for example, U.S. Pat. No. 5,896,721, granted to Kazuo Sugiyama. The top of the "T" is connected by a variety of methods, while the base of the "T" is connected by means of dowels, screws, pins or nails driven from the sides of the member into the base of the "T".

Methods based on the T-shaped plate can be time intensive, and thus generally expensive. They require great accuracy in making the proper sized slots and even greater accuracy in properly positioning the dowels or screws in the base of the "T". Often, special tools are needed. Furthermore, if the members to be connected are made of wood and they are not moisture free, severe splitting of the member that receives the base of the "T" can develop around the dowels or pins.

Finally, the saw cuts and the ends of the dowels need to be hidden with wood filler.

Two much simpler forms of hidden connectors are taught by U.S. Pat. Nos. 4,587,788 and 4,854,549.

The first, U.S. Pat. No. 4,587,788, granted to Michael D. Bielicki in 1986, uses a plate having a "key-hole" aperture that can receive the flanged head of a fastener. A blind depression is formed in one of the members that is to be joined together, and the plate is inserted into the depression so that its upper surface is flush with or lies below the surface face of the member. The plate is then attached to the member by means of threaded fasteners. A fastener is then set in the other member to be joined. This fastener is formed with a flanged head that can be received in the widest portion of the "key-hole" opening in the plate, but will not slip through the narrower portions of the "key-hole" opening. The flanged fastener head is set above the surface of the member in which it is joined so that it can be inserted all the way through the "key-hole" opening. By inserting the flanged fastener into the widest portion of the "key-hole" opening and then sliding it into the narrower portion of the opening a positive attachment is made in which the means for the connection are hidden.

The connection described in U.S. Pat. No. 4,587,788 is comparatively easy to make. It is fairly simple to form the depression for receiving the plate, it is a very simple operation to install the fasteners, and the side surfaces of the members need not be disturbed.

The second patent, U.S. Pat. No. 4,854,549, granted to William F. Roberts and Truman D. Collins in 1989, is quite similar in that it has a plate that is received in a depression in one of the members, and that plate attaches to that member by means of screws. It is also similar in that an elongated anchor having a shank is received in the other member to be joined and that elongated anchor attaches to the plate. The difference between the two inventions is that in U.S. Pat. No. 4,854,549 the elongated anchor is fused to the plate. This limits the methods by which the connector can be installed, but it still retains the benefits of the earlier invention in that it is still relatively easy to install, and in one of its embodiments it is completely hidden.

The present invention shares the beneficial characteristics of U.S. Pat. Nos. 4,587,788 and 4,854,549 and improves upon them.

SUMMARY OF THE INVENTION

It is an object of the present invention to provide a connection between two members in a structure.

It is a further object to make such a connection wherein the means for making the connection are completely or almost completely hidden from view.

It is a further object of the present invention to provide a method by which a hidden connection is easily made.

It is a further object of the present invention to minimize the possibility of splitting the wooden members that are attached by the connection, if wooden members are used.

It is a further object of the present invention to disturb only one face or outer surface of one of the members making up the connection.

The present invention is a connection between a first member and a second member. The connector used to join the first and second members includes the following members: an attachment member, a plurality of fasteners that are received by the attachment member, and an anchor member that is also received by the attachment member.

In one form of the invention, these members are arranged in the following manner with respect to the first and second members. The fasteners are received by the attachment member and anchored in the second member. The fasteners are driven into the second member through the attachment member, thus the heads of the fasteners are closer to the attachment member than the leading tips of the fasteners. At least one of the fasteners lies at an angle to a longitudinal axis of the second member, and the same fastener is also driven at an angle to the central axis of the attachment member, such that the leading tip of the fastener is disposed farther away from the central axis of the attachment member than the driving head of the fastener. The anchor member is connected to the attachment member and anchored to the first member. The anchor member is formed with an elongated shank portion that is received within the first member.

In an alternate form of the invention, none of the fasteners need to lie at an angle to the central axis of the attachment member or the longitudinal axis of the second member. Rather, the attachment member is formed as a funnel-shaped member with tapered side wall portions, and the heads of the fasteners lie between the anchor member and the tapered side wall portions of the attachment member.

In another alternate embodiment of the present invention the attachment member need not be funnel shaped. Rather, it is formed with projections that are inserted into the first member that also receives the elongated shank portion of the anchor member.

In still another alternate embodiment of the present invention, the attachment member need not be formed with projections. Rather, it is formed and positioned in relation to the anchor member such that the anchor member extends deeper into the second member than the attachment member.

BRIEF DESCRIPTION OF THE DRAWINGS

FIG. 1 is perspective view of the end of a post with the attachment member of the connector positioned for insertion into a blind depression formed in the end of the post.

FIG. 2 is a partially exploded, perspective view of a connection made according to the present invention.

DESCRIPTION OF THE PREFERRED EMBODIMENT

Figures 3, 4:
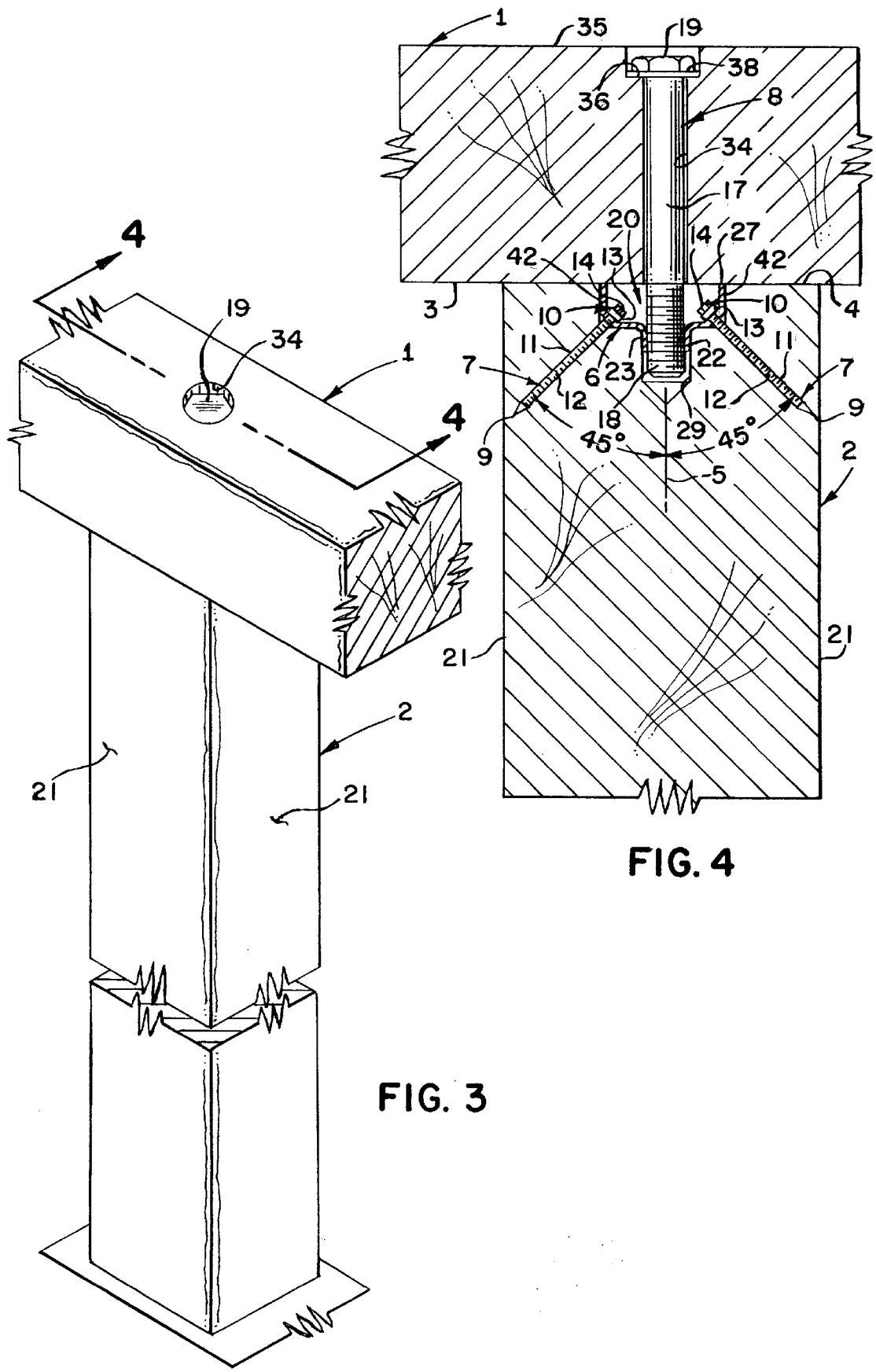
FIG. 3 is a perspective view of a connection made according to the present invention, showing how the means of making the connection are almost completely hidden from view.
FIG. 4 is a cross-sectional view taken along line 4—4 of FIG. 3.

The present invention is a connection between a first member 1 and a second member 2. The connection is designed to resist tension and shear forces between the members 1 and 2. Preferably, the first member 1 has a face surface 3, and the second member has a matching surface 4. In one preferred embodiment of the invention, the face surface 3 and the matching surface 4 are brought into flush contact and positively joined by the connector of the present invention. See FIG. 4. This creates a strong connection, as well as a connection that is aesthetically pleasing. As shown in FIG. 4, preferably, the face and matching surfaces 3 and 4 are planar.

Figure 5:
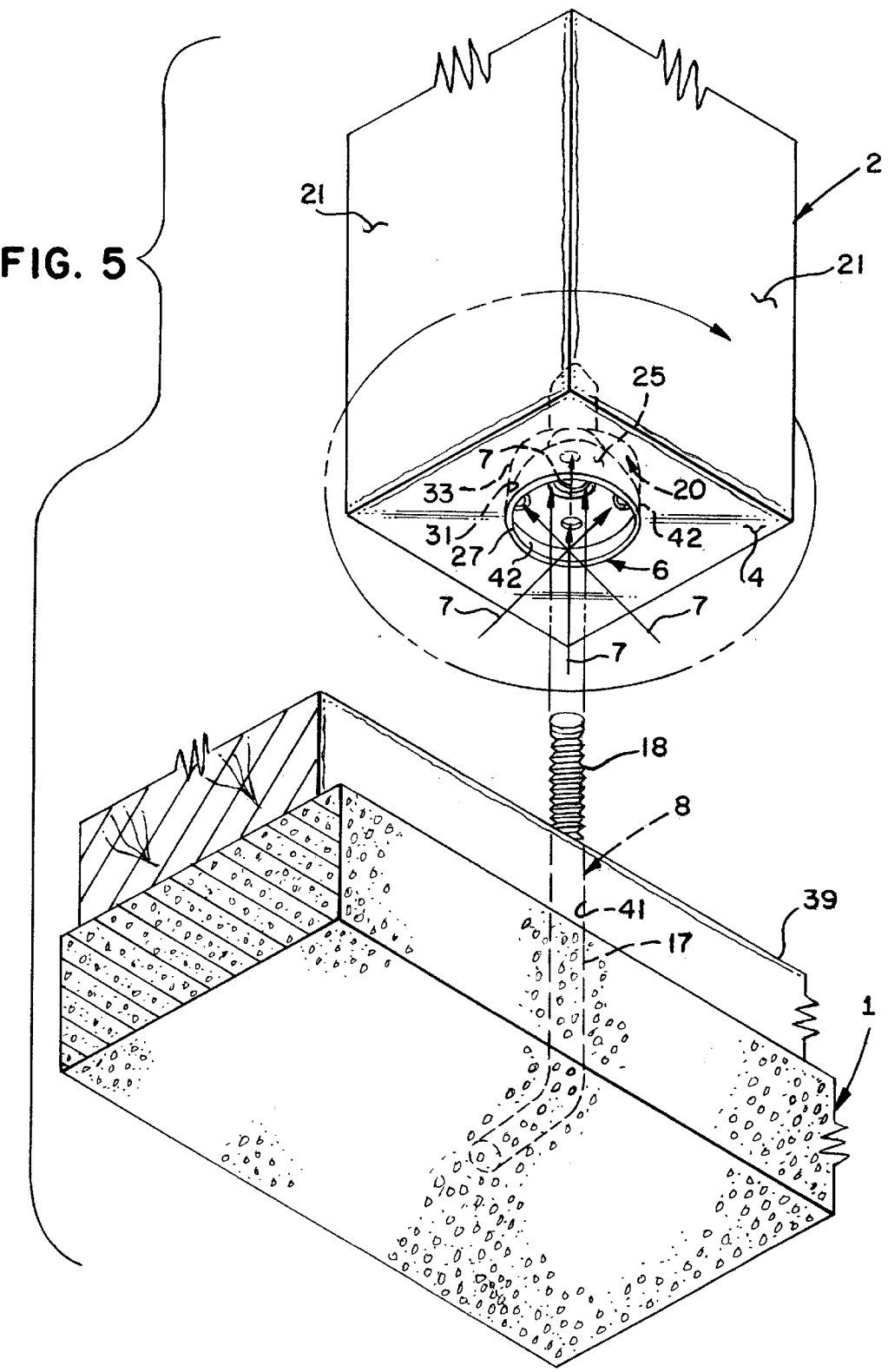
FIG. 5 is a perspective bottom view of a post being inserted onto an anchor bolt embedded in a foundation.

The first and second members 1 and 2 can be structural framing members in a building. As shown in all the figures showing the connection, the second member 2 is preferably a post or upright stud. As shown in FIGS. 2, 3 and 4, the second member 2 can be a horizontally-disposed, structural framing member of a building. The first and second members 1 and 2 can both be made from wood. As shown in FIG. 5, the first member 1 can also be a cementitous member of a structure. FIG. 5 shows a horizontally disposed foundation, but the first member 1 could also be a vertically disposed cementitous member, and the second member 2 could be a horizontally disposed framing member.

In order to better define the invention, the second member 2 is described as having a longitudinal axis 5 as shown in FIG. 4. This description does not impose any particular shape on the second member 2, for example, it does not mean that the second member 2 need be elongated along this longitudinal axis 5.

A first preferred embodiment of a connector used to join the first and second members 1 and 2 consists of the following members: an attachment member 6, a plurality of fasteners 7 that are received by the attachment member 6, and an anchor member 8 that is also received by the attachment member 6. These members are preferably arranged in the following manner with respect to the first and second members 1 and 2.

Figures 6, 7:
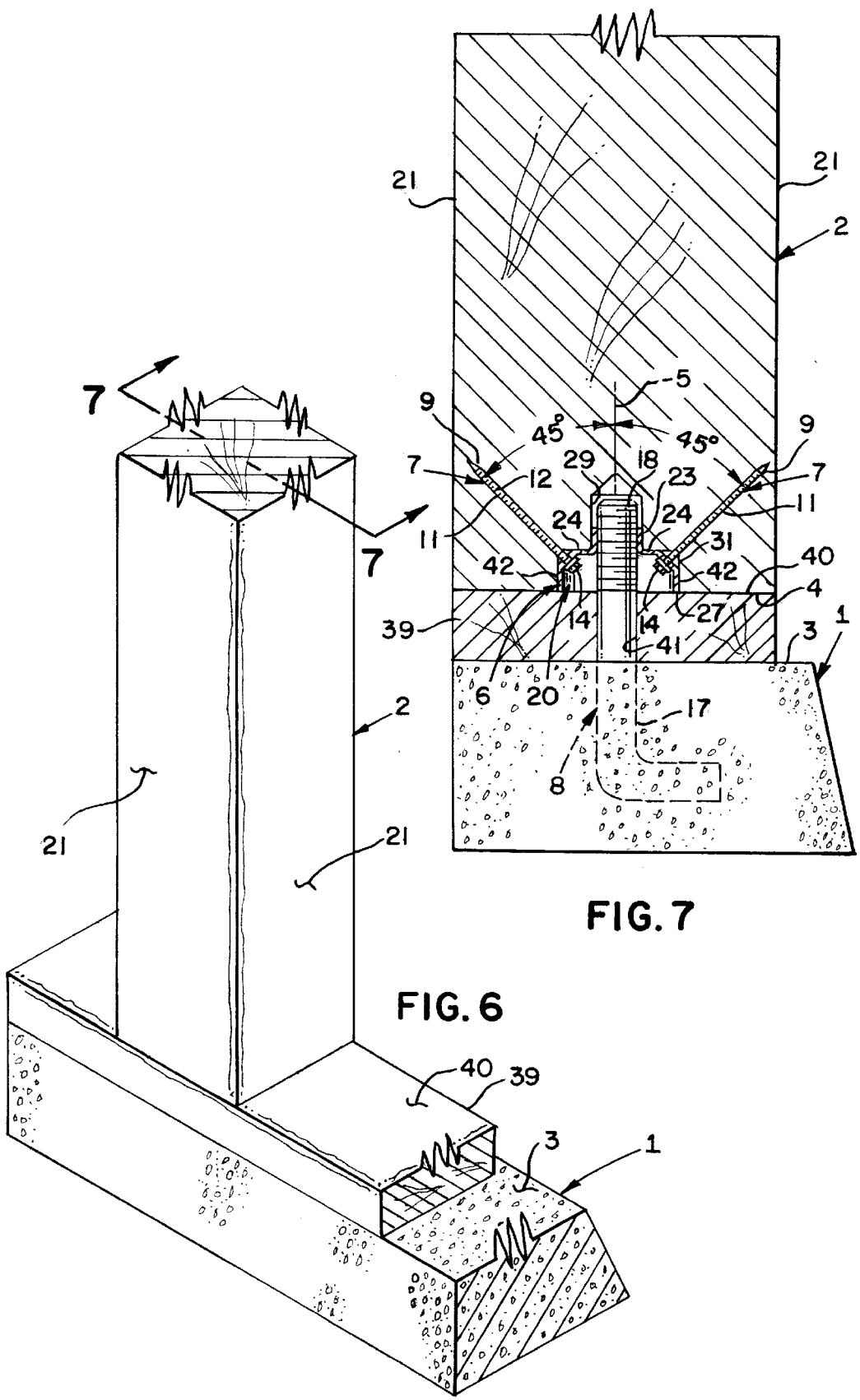
FIG. 6 is a perspective view of a connection made according to the present invention.
FIG. 7 is a cross-sectional view taken along line 7—7 of FIG. 6.
Figure 8:
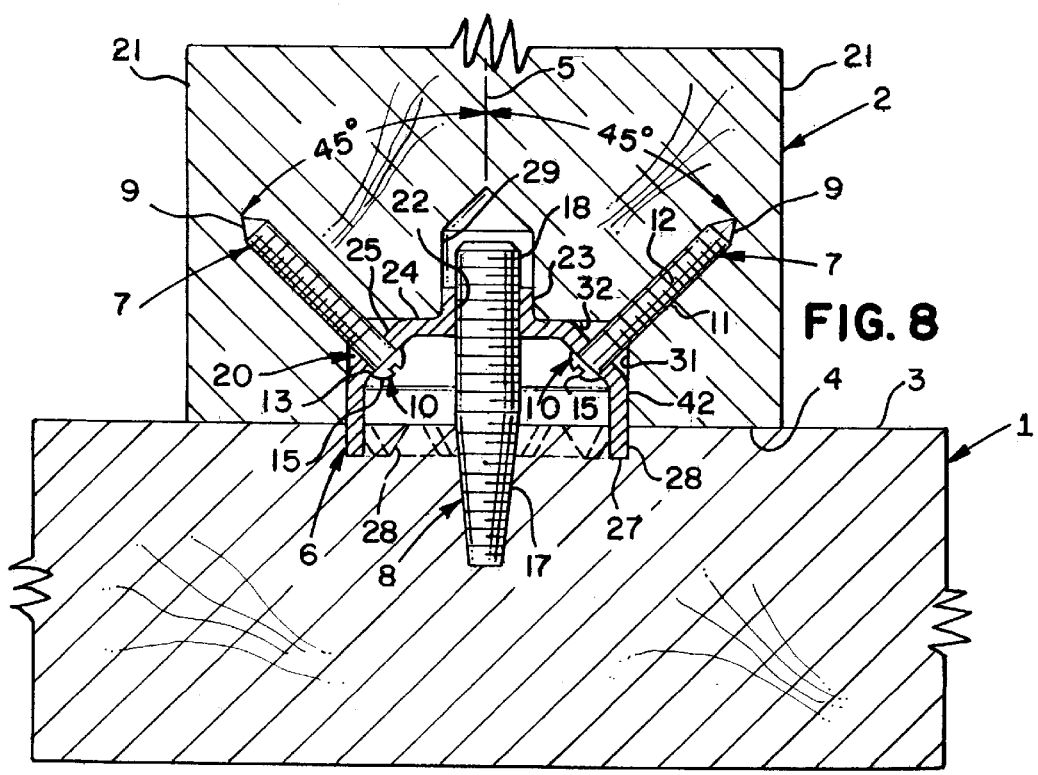
FIG. 8 is a cross-sectional view of a connection made according to the present invention.

First, the fasteners 7 are received by the attachment member 6 and anchored in the second member 2. In order to improve the strength of the connection, the fasteners 7 lie at an angle to the longitudinal axis 5 of the second member 2. This is preferably an acute angle of 45 degrees, as shown in FIG. 4. The angling of the fasteners 7 helps to reduce splitting of the second member 2 when the second member 2 is made from wood. It also creates a shear component on the fasteners 7, when the connection is under tension. It also helps to distance the fasteners 7 from each other which also strengthens the connection. The fasteners 7 are typical of most fasteners in that they have leading tips 9 and driving heads 10. See also FIGS. 4 and 8. Preferably, when the second member 2 is formed from wood, the fasteners 7 are wood screws having pointed self-drilling tips 9 that cut their own threads. The leading tips 9 need not be pointed. The shank 11 of the fastener 7 is formed with threads 12. The shank 11 ends in a flanged, driving head 10. The flange 13 of the head 10 allows the fasteners 7 to better hold the attachment member 6 to the second member 2. The flanged head 10 is preferably formed to allow the fastener 7 to be driven with a power screw driver. In FIGS. 4 and 7, the fasteners 7 are shown with hexagonal heads 14. In FIG. 8, the fasteners 7 are shown with standard heads 15. Other types of heads 10 are well known in the art. Other types of fasteners 7 could also be used, as well as nails.

In this first preferred form of the connection, the fasteners 7 are driven into the second member 2 through the attachment member 6, thus the flanged heads 10 are closer to the attachment member 6 than the leading tips 9 of the fasteners 7. Driving the fasteners 7 through the attachment member 6, first, and then into the second member 2, is preferable to trying to drive the fasteners 7 through the second member 2 and then into the attachment member 6. The preferred method, for example, allows the user to easily make a positive connection between the fasteners 7 and the attachment member 6 without having to pre-bore holes for the fasteners 7.

Figure 9:
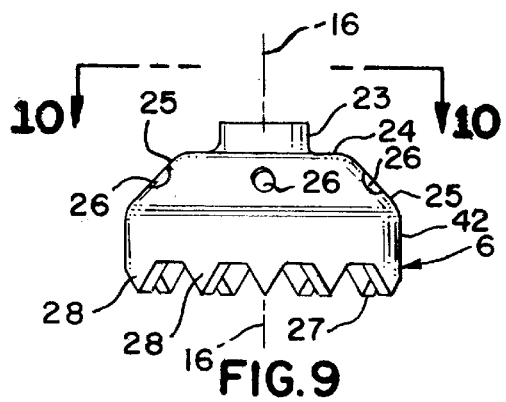
FIG. 9 is a side view of the funnel-shaped attachment member of the present invention.
Figure 10:
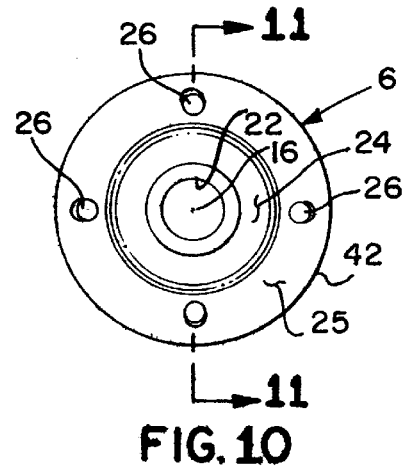
FIG. 10 is a top view taken along line 10—10 of FIG. 9.
Figure 12:
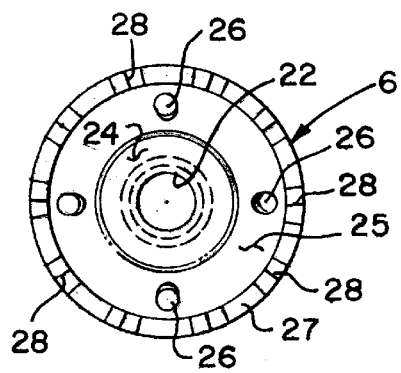
FIG. 12 is bottom view taken along line 12—12 of FIG. 11.

In the first preferred form of the connection, as discussed above, the fasteners 7 are also driven into second member 2 through the attachment member 6 at an angle to the longitudinal axis 5 of the second member 2. The fasteners 7 are also preferably driven at an angle to the central axis 16 of the attachment member 6. FIGS. 9 and 10 show the central axis 16 of the attachment member 6. Preferably, the central axis 16 of the attachment member 6 aligns with the longitudinal axis 5 of the second member 2 as is shown in FIGS. 1, 2, 4, 5, 7 and 8. This helps prevent eccentric loading on the connection. In the preferred embodiment, when the fasteners 7 are driven at an angle to the central axis 16 of the attachment member 6, the leading tips 9 of the fasteners 7 will be disposed farther away from the central axis 16 of the attachment member 6 than the driving heads of the fasteners 7.

Second, the anchor member 8 is connected to the attachment member 6 and anchored to the first member 1. The anchor member 8 is formed with an elongated shank portion 17 that is received within the first member 1. As shown in FIG. 1, one preferred embodiment of the anchor member 8 can be a carriage bolt, having a threaded end 18 that is threaded into the attachment member 6.

It is preferable to make the attachment member 6 and the anchor member 8 as two distinct members that are attached during the formation of the connection, although they could be made as a single unit. For example, they could be welded together or forged or molded as a single unit. The preferred method of coupling the attachment member 6 and the anchor member 8 is by threading the two together.

Having the anchor member 8 and the attachment member 6 separate, allows the fasteners 7 to be connected to the attachment member 6 without any interference from the anchor member 8. As described below, and as shown in FIG. 5, it also allows the anchor member 8 to be positioned in the first member 1 before it is connected to the attachment member 6. It also allows for the first and second members 1 and 2 to be positioned in relation to each before the anchor member 8 is connected to the attachment member 6. This can be helpful when it is preferable to position the first member 1 on the second member 2 at a time when the anchor member 8 does not protrude from the matching surface 4 of the second member 2.

In all the preferred forms of the present invention, the members that make up the connector—the fasteners 7, the attachment member 6, and the anchor member 8—are completely hidden or almost completely hidden from view. For example, in FIG. 3, only the head 19 of the anchor member 8 can be seen when the connection is completed, and it is embedded within the first member 1, and is thus difficult to see.

This is accomplished, in part, by hiding the attachment member 6 or almost all of the attachment member 6 within a blind opening 20 in the second member 2. Specifically, a blind opening 20 is formed in the second member 2 in its matching surface 4. The blind opening 20 has no portions in communication with any of the other outer surfaces 21 of the second member 2. Generally, the second member 2 will be formed as a six-sided member of generally rectangular cross-section, with the matching surface 4 and the other outer surfaces 21 making up the sides of the member 2. As shown in FIG. 4, in one preferred embodiment, the attachment member 6 can be fully received within the blind opening 20. As shown in FIG. 8, in another preferred embodiment, the attachment member 6 is partially received within the blind opening 20 in the second member 2.

The hiding of the connector is also accomplished in part by drilling the fasteners 7 into the second member 2 through the attachment member 6 and making them short enough so that they do not protrude through any of the other outer surfaces 21 of the second member 2.

Figure 11:
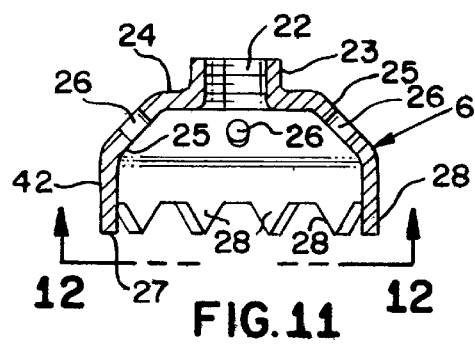
FIG. 11 is a cross-sectional side view of the attachment member of FIG. 10, taken along line 11—11.

As shown in all the figures that depict the attachment member 6, it is preferably funnel-shaped with side walls tapering toward the center of the attachment member 6. See especially FIGS. 8, 9 and 11. Forming the attachment member 6 as a funnel-shaped member helps to position the fasteners 7 at the preferred angle to the longitudinal axis 5. Forming the attachment plate 6 as a funnel-shaped member that can be embedded in the second member 2 also creates an increased bearing surface for the connector on the second member 2 perpendicular to the longitudinal axis 5 of the second member 2. This is helpful when the connection is subjected to a shear loads, increasing the performance of the connection. The device is preferably symmetric around its central axis 16. At its center, it is preferably formed with a threaded opening 22 for receiving the anchor member 8. The threaded opening 22 in the attachment member 6 is preferably formed with extended sides 23 which allow greater threaded contact between the threaded end 18 of the anchor member 8 and the threaded opening 22.

Traveling away from the center of the attachment member 6, the preferred attachment member 6 is then formed with a stepped shoulder 24. This stepped shoulder 24 lies perpendicular to the central axis 16 of the attachment member 6. Farther outward on the attachment member 6 the side walls are disposed at an acute angle to the central axis 16 of the attachment plate, creating tapered side wall portions 25. Openings 26 for the fasteners 7 are preferably formed in the tapered side wall portions 25. These openings 26 are preferably circular.

In the preferred form of the invention, the side walls then turn and travel parallel to the central axis 16 of the attachment member 6, creating the preferred form of a lateral wall 42. The preferred lateral wall 42 is parallel to the longitudinal axis 5, annular and disposed away from the anchor member 8. In one preferred embodiment of the attachment member 6 shown in FIGS. 8, 9, 10, 11 and 12, the outer lip 27 of the side wall is formed with projections 28. These projections are preferably tapered, creating a serrated outer lip 27. These projections 28 can be used to create a stronger connection between the first and second member 2 by digging into the first member 1. They provide lateral stability to the connection, and also serve to transfer shear forces to the first member 1.

As best shown in FIGS. 2, 4, 5, 7 and 8, the attachment member 6 is preferably substantially wider than the anchor member 8. This allows the attachment member 6 to be pierced by the anchor member 8, while having areas where the fasteners 7 can be received by the attachment member 6. In combination with the lateral wall 42 this also creates a larger lateral bearing surface. Preferably, the driving heads 10 of the fasteners 7 are disposed between the anchor member 8 and the tapered side walls portions 25 of the attachment member 6.

In one preferred embodiment, the connector is used to anchor a horizontal structural member or first member 1 to an upstanding post or second member 2. See FIGS. 1 and 2.

First, the top end of the post or second member 2 is prepared. The end or matching surface 4 of the post is drilled to create a blind bore 29 for the threaded end 18 of the anchor member 8, which in this case is a carriage bolt, and the extended threaded opening 22 of the preferred, funnel-shaped attachment member 6. Then, the end 4 of the post 2 is routed with an auger to create a circular depression 30 large enough and deep enough that, together with the drilled bore 29, can completely receive the preferred, funnel-shaped attachment member 6. In one preferred embodiment, the circular depression 30 for the cup-shaped attachment member 6 is just deep enough so that the outer lip of the attachment member 6 lies just below or flush with the end surface of the post which receives it.

Preferably, the centers of the blind bore 29 and the circular depression 30 are axially aligned. In the preferred embodiment, the blind bore 29 and circular depression 30 are also centered on the longitudinal axis 5 of the post 2. The drilled bore 29 is substantially deeper than the wider depression 30. Preferably, the anchor bolt 8 is threaded into the funnel-shaped attachment member 6 so that a portion of the threaded anchor bolt 8 extends past the attachment member 6. This helps ensure that the attachment member 6 has been completely threaded on the anchor bolt 8.

After the end of the post 2 is prepared, the attachment member 6 is placed in the depression and, preferably, four threaded fasteners 7 are drilled through openings 26 spaced around the side walls of the attachment member 6 and into the post 2. The preferred attachment member 6 is funnel-shaped with the openings 26 occurring in the tapered side wall portions 25 of the attachment member 6. The tapered side wall portions 25 allow the openings 26 to be formed as circular openings, and yet still be able to closely receive the shanks 11 of the fasteners 7 driven into the post 2 at an angle to its longitudinal axis 5.

Preferably, the threaded fasteners 7 are inserted into post 2 at an angle of 45 degrees to the longitudinal axis 5 of the post 2. In the preferred embodiment, where the funnel-shaped attachment member 6 is used, it is preferable that the circular depression 30 be formed in a specific manner. The circular depression 30 has a cylindrical tunnel wall 31, defining its sides, and base wall 32 at its end. Specifically, the diameter of the circular depression 30 should be just sufficient so that the funnel-shaped attachment member 6 is closely received by the tunnel wall 31. The tunnel wall 31 also needs to be formed parallel to the longitudinal axis 5 of the post or second member 2. Similarly, the circular depression 30 is preferably formed with a flat base wall 32 that receives the stepped shoulder 24 of the funnel-shaped attachment member 6. The flat base wall at the end of the circular depression 30 should be formed perpendicular to the longitudinal axis 5 of post 2. In this manner, the tunnel wall 31 and the base wall 32 meet or intersect at a circular edge 33 that is ideal for helping to drill the fasteners 7 into the post 2 at the preferred angle of 45 degrees.

Forming the circular depression 30 in this manner, together with using the preferred funnel-shaped attachment member 6 that has a tapered side wall portion 25 where the fasteners 7 are received, creates space between the attachment member 6 and the tunnel wall 31 where the fasteners 7 pass through the attachment member 6. See FIGS. 4, 7 and 8. When the fastener 7 is inserted through the tapered side wall portion 25 of the attachment member 6, it will first enter this space and then come into contact with either the base wall 32 or the tunnel wall 31 of the circular depression 30. Most likely, the tip 9 of the fastener 7 will then want to slide down either of the walls 31 or 32 to the circular edge 33 where they meet, and then start its entry into the second member 2.

Preferably, the fastener openings 26 in tapered side wall portion 25 of the attachment member 6 and the point on the circular edge 33 of the circular depression 30 where the fastener tip 9 meets the circular edge 33 define an entry axis for each fastener 7 that lies at the preferred angle to the longitudinal axis 5 of the post or second member 2. In the preferred embodiment this is a 45 degree angle.

The angle for the entry of the fasteners 7 can be changed in a number of ways: the position of the fasteners 7 openings in the tapered side wall portion 25 of the attachment member 6 can be changed, the shape of the attachment member 6 can be changed, and the depth and form of the circular depression 30 can be changed.

In the preferred embodiment, the fasteners 7 are not so long that they exit the post 2 through any of its outer side surfaces 21.

In one preferred embodiment, and as shown in FIG. 2, the upper horizontal member 1 is prepared by drilling a tunnel 34 through it that can receive a carriage bolt or other similar anchor member 8. The diameter of the tunnel 34 is preferably slightly larger than the diameter of the shank 17 of the bolt 8. Preferably, the tunnel 34 is widened near the upper outer surface 35 of the horizontal member 1, creating a shoulder 36, such that the head 19 of the bolt is inset into the horizontal member 1 such that it does not protrude above the upper surface 35 of the horizontal member 1.

The bolt 8 has a threaded end 18 and is long enough to extend from the bottom surface or face surface 3 of the horizontal member or first member 1 such that it can be fully threaded onto the attachment member 6, when its head is received by the shoulder 36 with a washer 38 between the head 19 and the shoulder 36. Preferably, the bolt 8 extends all the way through the attachment member 6 so that it lies deeper in the post 2 than the attachment member 6.

After the tunnel 34 has been prepared in the horizontal member 1, the horizontal member 1 is lifted onto the post 2 and the tunnel 34 in the horizontal member 1 is aligned with the threaded opening 22 in the attachment member 6.

A washer 38 is then slipped onto the bolt 8 and the bolt 8 is inserted through the tunnel 34 in the horizontal member 1 and into the threaded opening 22 in the attachment member 6. The bolt 8 is then threaded onto the threads of the threaded opening 22 until the connection is tight.

The connector can also be used to anchor a post 2 to the foundation 1 of a building, as shown in FIGS. 5, 6 and 7. In this instance, the foundation is the first member 1. When using the device in this manner, the bolt or threaded anchor 8 is held motionless in the foundation 1, and the post 2 is threaded onto the anchor 8.

In the preferred form of this connection, an anchor bolt 8 is set in the foundation 1. The anchor bolt 8 can be part of the foundation 1 as poured, or it can be set in the foundation 1 after the foundation 1 had hardened. The preferred form of setting an anchor bolt 8 after the foundation 1 has set would be to drill a blind tunnel in the foundation 1 and use epoxy to attach the anchor bolt 8. Other means for retrofitting anchors 8 in foundations 1 are also appropriate, including the use of wedge or expansion anchors.

As described above, the anchor bolt 8 is formed with a threaded end 18. The anchor bolt 8 is set in the foundation 1 such that its threaded end 18 protrudes above the top surface or face 3 of the foundation 1. If the connection is designed to accommodate a bottom sill plate 39 or stand-off base between the bottom or matching surface 4, in this instance, of the post 2 and the top 3 of the foundation 1, then, preferably, the bolt 8 should extend from the foundation 1 such that the threaded end 18 rises above the top surface 40 of the bottom sill plate 39 or other member. See FIGS. 5, 6 and 7.

The end or matching surface 4 of the post 2 is prepared as above. Preferably, the end 4 of the post 2 is drilled and routed to create a stepped opening 20 large enough and deep enough to completely receive the funnel-shaped attachment member 6. As described above, preferably, the centers of the blind tunnels 29 and 30 formed by the drill and the auger are axially aligned and the drilled hole 29 is deeper than the wider depression 30 for receiving the funnel-shaped attachment member 6. Furthermore the blind bore 29 and blind depression 30 are centered on the longitudinal axis 5 of the post 2.

After the end of the post 2 is prepared, the attachment member 6 is placed in the blind opening 20 and, preferably, four threaded fasteners 7 are drilled through openings 26 in the tapered side wall portions 25 of the attachment member 6 and into the post 2. As described above, the preferred attachment member 6 is funnel-shaped with the openings 26 occurring in the tapered side walls portions 25 of the attachment member 6. This allows the openings 26 to be formed as circular openings yet still be able to closely receive the shank 11 of the fasteners 7 driven into the post 2 at an angle to the longitudinal axis 5 of the post 2.

If a bottom sill plate 39 is used, it is prepared by drilling a tunnel 41 through the bottom plate 39 that will allow the anchor bolt 8 to pass through the bottom plate 39. Stand-off bases are usually formed to receive anchor members 8 therethrough.

The components are then assembled together. The bottom plate 39 is placed over the anchor bolt 8 and onto the top surface 3 of the foundation 1. The post 2 is then lifted over the anchor bolt 8 and threaded onto it, by rotating the post 2, until a tight connection is established.

FIG. 8, shows still another preferred connection that can be made according to the present invention. This connection is similar to that shown in FIG. 7, where the connector is used to anchor a post 2 to the foundation 1 of a building. As in that connection, the bolt or threaded anchor 8 is held motionless, and the post 2 is threaded onto the anchor 8. The difference is that in the connection of FIG. 8, the anchor 8 has threaded portions at both ends, and is drilled into the first member 1, and anchored by its threads.

FIG. 8 also shows an alternate preferred embodiment of the connector. In this embodiment the outer lip 27 of the attachment member 6 is formed with projections 28 formed as serrated teeth. These serrated teeth 28 bite into the first member 1 as the post 2 is rotated onto the threaded anchor 8. These teeth 28 improve the connection between the members 1 and 2. This embodiment of the attachment member 6 can also be used with other types of elongated anchors 8.

The funnel-shaped attachment member 6 is preferably made on a progressive or transfer die from the galvanized sheet metal. The attachment member 6 can also be formed from plastic, aluminum or forged metal to give a few examples. The anchor member 8 and fasteners 7 are preferably widely available members that can be used in a variety of applications.

I claim:

1. A connection between a first member and a second member, comprising:
   a. said first member;
   b. said second member, having a longitudinal axis;
   c. a connector attaching said first member to said second member, said connector including:
      1. an attachment member, having a central axis;
      2. a plurality of fasteners received by said attachment member and anchored in said second member, at least one of said fasteners lying at an angle to said longitudinal axis of said second member, said fasteners also having leading tips and driving heads, said driving heads being closer to said attachment member than said leading tips, and at least one of said leading tips of one of said fasteners being disposed farther away from said central axis of said attachment member than said driving head of said fasteners; and
      3. an anchor member connected to said attachment member and anchored to said first member, said anchor member having an elongated shank portion received in said first member;
   wherein said second member has a matching surface, and a plurality of other outer surfaces defining its boundaries, and said anchor member is fully received in a blind opening in said matching surface of said second member, said blind opening having no portions in communication with any of said other outer surfaces of said second member.

2. The connection of claim 1, wherein:
   said at least one fastener lies at an acute angle to said longitudinal axis of said second member.

3. The connection of claim 1, wherein:
   a. said second member has a matching surface, and a plurality of other outer surfaces defining its boundaries; and
   b. said attachment member is, at least, partially received in a blind opening in said matching surface of said second member, said blind opening having no portions in communication with any of said other outer surfaces of said second member.

4. The connection of claim 1, wherein:
   a. said second member has a plurality of other outer surfaces defining its limits; and
   b. said fasteners do not pass sufficiently through said second member to communicate with any of said other outer surfaces of said second member.

5. The connection of claim 1, wherein:
   a. said attachment member is at least partially received in an opening in said second member, and said opening has a tunnel side wall and a base wall, said tunnel side wall and said base wall meeting at an edge; and
   b. wherein said at least one fastener driven at an angle to said longitudinal axis passes through said edge where said tunnel wall and said base wall meet.

6. The connection of claim 1, wherein:
   said attachment member is funnel-shaped.

7. The connection of claim 1, wherein:
   said anchor member has a threaded end that is received in a threaded opening in said attachment member.

8. The connection of claim 7, wherein:
   said threaded opening in said attachment member has extended side walls which allow greater threaded contact between said threaded end of said anchor member and said threaded opening.

9. The connection of claim 1, wherein:
   said attachment member is made from sheet metal.

10. The connection of claim 1, wherein:
    said elongated shank of said anchor member has a selected diameter, and said attachment member is substantially wider than said selected diameter.

11. The connection of claim 1, wherein:
    said first and second members are structural members of a building.

12. The connection of claim 11, wherein:
    said first member is horizontally disposed, and said second member is vertically disposed.

13. The connection of claim 11, wherein:
    said first member is a cementitous member, and said second member is a structural framing member.

14. A connection between a first member and a second member, comprising:
    a. a first member;
    b. a second member;
    c. a connector attaching said first member to said second member, said connector including:
       1. an anchor member connected to said first member, said anchor member having an elongated shank portion received in said first member;
       2. a funnel-shaped attachment member connected to said anchor member, having tapering side wall portions; and 3. a plurality of fasteners received by said attachment member in said tapering side wall portions and anchored in said second member, said fasteners having elongated shanks having driving heads at one end, said driving heads of said fasteners being disposed between said anchor member and said tapering side wall portions of said attachment member;

wherein said second member has a matching surface, and a plurality of other outer surfaces defining its boundaries, and said attachment member is, at least, partially received in a blind opening in said matching surface of said second member, said blind opening having no portions in communication with any of said other outer surfaces of said second member.

15. The connection of claim 14, wherein:
   a. said second member has a plurality of other outer surfaces defining its limits; and
   b. said fasteners do not pass sufficiently through said second member to communicate with any of said other outer surfaces of said second member.

16. The connection of claim 14, wherein:
   a. said attachment member is at least partially received in an opening in said second member, and said opening has a tunnel side wall and a base wall, said tunnel side wall and said base wall meeting at an edge; and
   b. wherein at least one of said fasteners is driven at an angle to said longitudinal axis and passes through edge where said tunnel wall and said base wall meet.

17. A connection between a first member and a second member, comprising:
   a. said first member;
   b. said second member, having a longitudinal axis;
   c. a connector attaching said first member to said second member, said connector including:
      1. an attachment member, having a central axis and one or more projections that are received in said first member;
      2. a plurality of fasteners received by said attachment member and anchored in said second member; and
      3. an anchor member connected to said attachment member and anchored to said first member, said anchor member having an elongated shank portion received in said first member;

wherein said second member has a matching surface, and a plurality of other outer surfaces defining its boundaries, and said attachment member is partially received in a blind opening in said matching surface of said second member, said blind opening having no portions in communication with any of said other outer surfaces of said second member.

18. The connection of claim 17, wherein: at least one of said fasteners lies at an acute angle to said longitudinal axis of said second member.

19. The connection of claim 17, wherein:
   a. said second member has a plurality of other outer surfaces defining its limits; and
   b. said fasteners do not pass sufficiently through said second member to communicate with any of said other outer surfaces of said second member.

20. The connection of claim 17, wherein:
   a. said attachment member is at least partially received in an opening in said second member, and said opening has a tunnel side wall and a base wall, said tunnel side wall and said base wall meeting at an edge; and
   b. wherein at least one of said fasteners is driven at an angle to said longitudinal axis and passes through said edge where said tunnel wall and said base wall meet.

21. The connection of claim 17, wherein:
said attachment member is funnel-shaped.

22. The connection of claim 17, wherein:
said elongated shank of said anchor member has a selected diameter, and said attachment member is substantially wider than said selected diameter.

23. A connection between a first member and a second member, comprising:
   a. said first member;
   b. said second member, having a longitudinal axis;
   c. a connector attaching said first member to said second member, said connector including:
      1. an attachment member, having a central axis;
      2. a plurality of fasteners received by said attachment member and anchored in said second member; and
      3. an anchor member connected to said attachment member and anchored to said first member, said anchor member having an elongated shank portion received in said first member, and wherein said anchor member extends past said attachment member so that it lies deeper in said second member than said attachment member;

wherein said second member has a matching surface, and a plurality of other outer surfaces defining its boundaries, and said attachment member is, at least, partially received in a blind opening in said matching surface of said second member, said blind opening having no portions in communication with any of said other outer surfaces of said second member.

24. The connection of claim 23, wherein:
at least one of said fasteners lies at an acute angle to said longitudinal axis of said second member.

25. The connection of claim 23, wherein:
   a. said second member has a plurality of other outer surfaces defining its limits; and
   b. said fasteners do not pass sufficiently through said second member to communicate with any of said other outer surfaces of said second member.

26. The connection of claim 23, wherein:
   a. said attachment member is at least partially received in an opening in said second member, and said opening has a tunnel side wall and a base wall, said tunnel side wall and said base wall meeting at an edge; and
   b. wherein at least one of said fasteners is driven at an angle to said longitudinal axis and passes through said edge where said tunnel wall and said base wall meet.

27. The connection of claim 23, wherein:
said attachment member is funnel-shaped.

28. The connection of claim 23, wherein:
said elongated shank of said anchor member has a selected diameter, and said attachment member is substantially wider than said selected diameter.

* * * * *